United States Patent [19]

Ikegami et al.

[11] 4,412,937
[45] Nov. 1, 1983

[54] METHOD FOR MANUFACTURE OF ACTIVATED CARBON FIBER

[75] Inventors: Shigeru Ikegami, Mishima; Minoru Hirai, Shizuoka; Kazuo Izumi, Shizuoka; Kenji Shimazaki, Shizuoka, all of Japan

[73] Assignee: Toho Belson Co., Ltd., Tokyo, Japan

[21] Appl. No.: 371,164

[22] Filed: Apr. 23, 1982

[30] Foreign Application Priority Data

Apr. 23, 1981 [JP] Japan .................................. 56-61646
May 13, 1981 [JP] Japan .................................. 56-72067

[51] Int. Cl.$^3$ ........................ B01J 37/28; B01J 37/00; D01F 9/12
[52] U.S. Cl. ................................ 502/423; 423/447.4; 423/447.5; 502/425; 502/417
[58] Field of Search ............................. 252/422, 423; 423/447.1, 447.2, 447.4, 447.5, 447.6, 447.9; 264/29.2

[56] References Cited

U.S. PATENT DOCUMENTS

| 4,195,649 | 4/1980 | Noguchi et al. | 423/447.1 |
| 4,197,279 | 4/1980 | Saito et al. | 423/447.5 |
| 4,256,607 | 3/1981 | Yoshida et al. | 264/29.2 X |
| 4,285,831 | 8/1981 | Yoshida et al. | 264/29.2 X |
| 4,362,646 | 12/1982 | Ikegami et al. | 252/422 |

Primary Examiner—Edward J. Meros
Assistant Examiner—Steven Capella
Attorney, Agent, or Firm—Sughrue, Mion, Zinn, Macpeak and Seas

[57] ABSTRACT

A method for manufacturing activated carbon fibers is disclosed. The method is comprised of the steps of:

(1) causing an acrylic fiber to contain therein a treating agent selected from the group consisting of phosphorus and boron compounds in a concentration of 0.01 to 0.3% by weight as phosphorus or boron based on the weight of the fiber;

(2) preoxidizing the acrylic fiber in an oxidizing atmosphere at a temperature exceeding 200° C. and giving a core ratio of 18% until the amount of bonded oxygen becomes not less than 15% by weight based on the weight of the fiber thereby producing a preoxidized fiber;

(3) adjusting the concentration of the treating agent in the preoxidized fiber to a level in the range of 0.04 to 1% by weight based on the thus obtained preoxidized fiber; and (4) thereafter activating the fiber at a temperature in the range of 900° to 1,300° C. The resulting fiber has improved high strength, high adsorbing ability and high processibility.

23 Claims, No Drawings

METHOD FOR MANUFACTURE OF ACTIVATED CARBON FIBER

FIELD OF THE INVENTION

This invention relates to a method for the manufacture of high quality activated carbon fiber from acrylic fiber raw material. More particularly, this invention relates to a method for manufacturing activated carbon fiber having high strength, high adsorbing ability, and high processibility.

BACKGROUND OF THE INVENTION

Activated carbon fiber is produced by carbonizing a raw material such as acrylic fiber, cellulosic fiber, phenol resin fiber, or pitch-based fiber and subsequently activating the carbonized fiber. The activated carbon fiber produced in the form of tow, woven fabrics, or felt is used as an adsorbent or a filter in devices such as those used for filtering automobile gasoline, deodorizing tobacco smoke, recovering a solvent, or purifying water. Due to its excellent performance the activated carbon fiber has attracted increasing attention. Particularly the activated carbon fiber derived from acrylic fiber as the raw material promises application to a great diversity of uses owing to its specific adsorbing ability and excellent mechanical strength due to the nitrogen atoms contained therein.

An example of a method of manufacturing activated carbon fiber from acrylic fiber as the raw material involves preoxidizing the acrylic fiber in an oxidative atmosphere such as air to obtain a preoxidized fiber and subsequently activating the preoxidized fiber with an activating medium such as steam. This method is taught by U.S. Pat. Nos. 4,256,607 and 4,285,831.

In the conventional method, preoxidation is first carried out at 200° to 400° C. Subsequently the activation is carried out at a temperature generally above 600° C. and particularly in the neighborhood of 800° C. When the activation is carried out at higher temperatures, the time for the treatment is shortened and the efficiency of the overall process is consequently improved. In accordance with the conventional method, if the activation temperature is elevated to level exceeding 1,000° C., for example, the fiber is suddenly shrunk, and may be shrunk to the extent of sustaining breakage and embrittlement. This renders the commercial production of activated carbon fiber infeasible. Accordingly, it is generally believed that it is not possible to manufacture activated carbon fiber of high quality by high-temperature activation.

The present inventors have diligently studied the steps of preoxidation and activation in order to determine the conditions which, contrary to the generally accepted concept, make it possible for activation to be effectively performed at higher temperatures. They have consequently succeeded in developing a technique which is capable of producing high quality activated carbon fiber, in spite of the fact that the activation is carried out at an elevated temperature for a shortened period of time.

SUMMARY OF THE INVENTION

An object of the present invention is to provide a method for manufacturing activated carbon fiber having high strength, high adsorbing ability and high processibility.

A further object of this invention is to provide a method for manufacturing activated carbon fiber with high efficiency in a shortened period of time.

This invention provides a method for manufacturing activated carbon fiber, comprising the steps of: (1) incorporating with an acrylic fiber a treating agent selected from the group consisting of phosphorus and boron compounds in a concentration of 0.01 to 0.3% by weight as phosphorus and/or boron based on the weight of the fiber; (2) preoxidizing the acrylic fiber in an oxidizing atmosphere at a temperature exceeding 200° C. and giving a core ratio of not more than 18% until the amount of bonded oxygen exceeds 15% by weight based on the weight of fiber thereby producing a preoxidized fiber; (3) adjusting the concentration of the phosphorus and/or boron in the preoxidized fiber to a level in the range of 0.04 to 1% by weight based on the thus obtained preoxidized fiber; and (4) thereafter activating the fiber at a temperature in the range of 900° to 1,300° C.

Generally, when the acrylic fiber is preoxidized in the form of tow, it is liable to be preoxidized unevenly. When the preoxidized fiber thus obtained is activated, the activated carbon fiber is produced in an embrittled form in low yields. In accordance with the method of this invention, the activated carbon fiber having high strength, high adsorbing ability and high processibility is produced in a short period of time in high yields. This invention is therefore economically advantageous.

DETAILED DESCRIPTION OF THE INVENTION

The expression "amount of bonded oxygen" as used in this disclosure represents a magnitude to be determined by the following formula.

$$\text{Amount of bonded oxygen (\% by weight)} = \frac{\left(\begin{array}{c}\text{Total weight} \\ \text{of sample}\end{array}\right) - \left(\begin{array}{c}\text{Weight} \\ \text{of ash}\end{array}\right) - \left(\begin{array}{c}\text{Total weight} \\ \text{of C, H, N}\end{array}\right)}{\left(\begin{array}{c}\text{Total weight} \\ \text{of sample}\end{array}\right) - \left(\begin{array}{c}\text{Weight} \\ \text{of ash}\end{array}\right)} \times 100$$

The expression "core ratio" of fiber as used in the present invention represents the area percentage of the cross section of core to the cross section of fiber as given by the following formula. Specifically, this percentage is obtained by cutting a section 3μ in thickness from a sample fiber, photomicrographing the section (by 400 magnifications), measuring the core and fiber diameters on the photomicrograph, and calculating the ratio as indicated by the formula. In the present disclosure, the core ratio is reported as an average obtained of a total of 20 specimens of a sample fiber.

$$\text{Core ratio (\%)} = \frac{\left(\begin{array}{c}\text{Cross section} \\ \text{of core}\end{array}\right)}{\left(\begin{array}{c}\text{Cross section} \\ \text{of fiber}\end{array}\right)} \times 100 = \left(\frac{\text{Diameter of core}}{\text{Diameter of fiber}}\right)^2 \times 100$$

The acrylic fiber used in connection with the present invention is a fiber which is obtained from a homopolymer or a copolymer containing at least 60% by weight, desirably 80 to 98% by weight, and most desirably 85 to 90% by weight, of acrylonitrile. Examples of the comonomer usable with acrylonitrile in the copolymer include acrylic acid, methacrylic acid, and allylsulfonic acid, salts, esters, acid chlorides, and acid amides of such acids, n-substituted derivatives of vinyl amides, vinyl chloride, vinylidene chloride, α-chloroacrylonitrile, vinyl pyridines, vinylbenzene sulfonic acid, vinyl sulfonic acid, and alkaline earth metal salts thereof. In addition, the acrylic fiber may be produced from a modified polymer obtained by the hydrolysis of part of the CN group of acrylonitrile polymer, a mixture of acrylonitrile polymer with an acrylonitrile copolymer, a mixture of copolymers or a polymer disclosed in U.S. Pat. No. 3,202,640 incorporated herein by reference to disclose the polymer. When a copolymer fiber contains acrylamide, methyl acrylate, or ethyl acrylate in a high concentration, it is liable to undergo agglutination in the early stage of the preoxidation of the fiber. Therefore, it is desirable that the content of such comonomer is not more than 20% by weight. When the copolymer fiber contains vinyl chloride, vinyl bromide, vinylidene chloride, or vinylidene bromide, it hardly induces agglutination even when the comonomer content is considerably larger. The comonomer content, therefore, may be as high as about 40% by weight. From the viewpoint of a high tensile strength of activated carbon fiber, it is desirable that the comonomer content in the copolymer is not more than 15% by weight. The inclusion in the copolymer fiber of at least 2% by weight of such a comonomer ensures production of activated carbon fiber of high adsorbing ability in high yields of activation.

Spinning of the acrylonitrile-based polymer can be carried out by any of the known methods. They are taught by, for example, U.S. Pat. Nos. 3,689,621, 3,346,685 and 2,790,700. Examples of useful spinning solvents advantageously employed in the spinning include inorganic solvents such as concentrated aqueous zinc chloride solution and concentrated aqueous nitric acid solution and organic solvents such as dimethylformamide, dimethylacetamide, and dimethyl sulfoxide.

The size of the acrylic fiber is not specifically limited but desirably falls into the range of 1.0 to 15 denier, preferably 2 to 5 denier. When the size is smaller than 1.0 denier, the fiber is deficient in strength and liable to break. When the size is greater than 15 denier, the fiber is preoxidized at a low speed and the produced activated carbon fiber tends to suffer from insufficiency of strength, elasticity, and yields of activation.

The presence of phosphorus and/or boron is important throughout the whole process of the manufacture of activated carbon fiber by the method of this invention. Particularly in the step of preoxidization, the phosphorus and/or boron is effective in decreasing the core ratio and preventing the fiber from otherwise possible agglutination.

The incorporation of phosphorus and/or boron to the fiber is effected in the form of a phosphorus compound and/or a boron compound. In the present invention, any phosphorus or boron compound which is capable of being uniformly distributed and/or contained throughout the surface and/or interior of the fiber may be used.

Examples of preferred phosphorus compounds usable in this invention include inorganic phosphorus compounds such as phosphoric acid, metaphosphoric acid, pyrophosphoric acid, phosphorus acid, and salts (ammonium, calcium, and magnesium salts) of such acids and organic phosphorus compounds such as substituted or unsubstituted alkyl, substituted or unsubstituted aryl phosphonates, phosphates, and phosphites. Of the organic compounds described above, particularly preferred are organic phosphorus compounds having an unsubstituted alkyl group of 1 to 16 carbon atoms of an alkyl group of 1 to 16 carbon atoms substituted with a chlorine atom, bromine atom, or hydroxyl group, and organic phosphorus compounds having a phenyl group, a substituted phenyl group, with a phenyl group, alkyl group of 1 to 16 carbon atoms, halogen atom, hydroxyl group, or ester group of $COOR_1$ ($R_1$ being an alkyl group of 1 to 16 carbon atoms or an aryl group such as, for example, a phenyl group). Concrete examples of such particularly preferred organic phosphorus compounds are n-butyl-bis(2-chloroethyl)phosphate and tris-chloroethyl phosphate.

Examples of preferred boron compounds usable in this invention include inorganic boron compounds such as boric acid, metaboric acid, and salts (ammonium, calcium, and magnesium salts) of such acids, and organic boron compounds such as those represented by the general formula $B(OR)_3$ (wherein R denotes a substituted or unsubstituted alkyl group or aryl group, providing that the substituents usable herein are identical to those enumerated above with respect to phosphorus compounds).

These phosphorus compounds and boron compounds may be used alone or in combination. Compounds from each group may be simultaneously used when necessary. The phosphorus compounds and the boron compounds, as used in the present invention, have no notable difference in terms of effect. However, in order to manifest a fixed level of effect, the amount of phosphorus required is smaller than that of boron.

The amount of phosphorus and/or boron to be added is in the range of 0.01 to 0.3% by weight, preferably 0.02 to 0.1% by weight based on the weight of the fiber before the addition. When the amount is smaller than 0.01% by weight, the preoxidized fiber has a core ratio higher than is allowable. When it is greater than 0.3% by weight, part of the fiber undergoes agglutination during the treatment of preoxidization, particularly in the early stage of the treatment, and the speed of the preoxidization is significantly lowered even to the extent of rendering the production commercially infeasible. In the present invention, the amount of phosphorus and/or boron in the course of the preoxidization must be maintained in the range of 0.01 to 0.3% by weight. When this amount decreases due to the escape or vaporization of the added compound, it may be replenished by adding the same compound in the course of the preoxidization. Generally, the amount of phosphorus and/or boron is desirably increased in proportion as the amount of bonded oxygen is increased. The problem of agglutination suddenly loses its weight when the amount of bonded oxygen becomes 5 to 8% by weight (reaches the range of 5 to 8% by weight). After this point has been reached, the phosphorus compound and/or boron compound may be additionally incorporated within a range in which the total phosphorus and/or boron content in the fiber does not exceed 0.6%. This additional incorporation may be effected either at a time immediately after the amount of bonded oxygen has become the aforementioned amount or piecemeal in the course of the preoxidization after the amount of bonded oxygen has become the aforementioned amount. When the additional incorporation of the treating agent is effected in this manner, the temperature of the preoxidization can be raised without entailing the undesired agglutination.

This invention gives preferable results when the conditions of preoxidation are varied, as described in subsequent paragraphs, between the former stage which proceeds until the amount of bonded oxygen becomes 5 to 8% and the latter stage which proceeds after the amount becomes 5 to 8%.

The aforementioned treating agent of phosphorus and/or boron compound is contained in the acrylic fiber in the form of a solution or dispersion. The compound may be adhered on the surface of the fiber and/or may be permeated into the fiber. This operation can be accomplished by any of the following methods. Where the phosphorus and/or boron compound must permeate to the center of the fiber, method (1) proves to be most effective.

(1) A method which effects the required inclusion of the treating agent by either immersing in a bath containing the treating agent or spraying with a liquid containing the treating agent, the fiber which is in the form of gel freshly obtained by the solution spinning of an acrylic polymer and not yet subjected to drawing.

(2) A method which effects the required inclusion of the treating agent by carrying out the immersion in a bath or by spraying with a liquid as described in (1) above when the fiber obtained by the solution spinning of an acrylic polymer which has undergone drawing and has not yet undergone drying.

(3) A method which effects the required inclusion of the treating agent by carrying out the immersion in a bath or by spraying with a liquid as described in (1) above immediately before the acrylic fiber produced is subjected to preoxidization.

Solutions or dispersions of the phosphorus and/or boron compounds which can be used for the purpose of the aforementioned incorporation include water or an organic solvent mediums having a low boiling point and which do not adversely affect the acrylic fiber. The concentration of the solution or dispersion is usually in the range of 0.5 to 4% by weight, preferably 1 to 2.5% by weight, for method of (1). The concentration is in the range of 0.01 to 0.5% by weight, preferably 0.05 to 0.3% by weight, for method (2). The concentration is in the range of 0.01 to 5% by weight, preferably 0.05 to 3.0% by weight, for method (3). The duration of immersion is 5 seconds to 1 minute for method (1), 5 seconds to 5 minutes for method (2), and 30 seconds to 30 minutes for method (3). Generally, the treating temperature may be normal room temperature. However, it may be as low as 5° C., or as high as 80° C. The use of a temperature above 80° C. is not desirable because the fiber may undergo thermal change at such an elevated temperature. After the fiber has been allowed to incorporate the liquid containing the treating agent by any of the methods described above, it may be dried or directly subjected to subsequent treatment without being dried. The drying of the fiber, if performed, is preferably carried out at a temperature not exceeding about 80° C.

Combined use of the aqueous solution or aqueous dispersion of the treating agent with an anionic, cationic, or nonionic surface active agent is effective in enhancing the uniformity of the incorporation of the phosphorus and/or boron compound. The amount of the surface active agent is in the range of 0.01 to 0.5 g, preferably 0.03 to 0.3 g, per liter of the aqueous solution or aqueous dispersion mentioned above.

The acrylic fiber which has been allowed to incorporate the treating agent as described above is then subjected to preoxidization. The preoxidization is carried out in an oxidizing atmosphere.

Any conventional media for preoxidization can be used. For example, a mixed gas consisting of 0.2 to 35% by volume, preferably 20 to 25% by volume, of oxygen plus inert gases such as nitrogen, argon, and helium can be used. This mixed gas may contain HCl, $SO_2$, $CO_2$, or combustion gas in a proportion of not more than 75% by volume. Generally from the standpoint of economy and stability of the process, it is most desirable to use either air or a mixed gas consisting of air and up to 25% by volume nitrogen gas.

In this invention, the medium to be used for the preoxidation may be varied between the former stage and the latter stage as mentioned previously. Specifically, the temperature of treatment can be raised and the duration of preoxidation can be consequently shortened without entailing the trouble of agglutination when the oxygen concentration in the medium is kept in the range of 20 to 35% by volume, preferably 25 to 30% by volume, during the former stage of the preoxidization and then in the range of 0.2 to 9% by volume, preferably 0.5 to 5% by volume, during the latter stage of the preoxidation. Further, in the latter stage of preoxidation, when a mixed gas containing 0.2 to 9% by volume of oxygen and 25 to 95% by volume of carbon dioxide is used as the medium, the temperature of treatment can be riseed to more than 400° C. and to a greater extent as a consequence of the increase of carbon dioxide content. When the medium for the preoxidation contains 95% by volume of carbon dioxide gas, the temperature of treatment can be raised to as high as 700° C. If the temperature is elevated to 700° C., the preoxidized fiber is not activated because, at this stage, the temperature of the preoxidation is low.

The time required for the preoxidation depends on the kind of acrylic fiber, i.e., the kind and quantity of comonomer used, and other factors such as the kind of the medium used in the preoxidization. The time for the preoxidation decreases with the rising temperature of the preoxidation. Generally, it falls in the range of 0.5 to 30 hours, preferably 1.0 to 10 hours. The preoxidation is continued until the amount of bonded oxygen reaches at least 15%. When the amount of bonded oxygen is lower than this value, the tow sustains breakage during the activation at the elevated temperature and the yield of activation itself is lowered. The amount of bonded oxygen is preferably at least 16.5%. It may be raised to the level of about 23 to 25%.

For the purpose of this invention, the core ratio is preferably as small as possible. The upper limit of the core ratio is 18, preferably 12, and more preferably 8. When the core ratio exceeds 18, the activated carbon fiber to be obtained fails to acquire high quality. In accordance with the present invention, the core ratio can be easily lowered below 5, even to 0.2, for example. Although the core ratio may be lowered to 0, such excessive lowering of the core ratio entails operational disadvantages such as elongation of the time for the preoxidation. In the first place, the manufacture of activated carbon fiber generally does not require such a low core ratio.

The core ratio of the preoxidized fiber is affected by the composition of the polymer forming the acrylic fiber as the raw material, i.e., the kind and content of comonomer, and the kind of atmosphere for the preoxidation. The temperature conditions for the preoxidation, therefore, are to be determined by an experiment performed on each fiber selected as the raw material. Generally, the core ratio decreases in proportion as the comonomer content decreases. The core ratio generally decreases in proportion to the temperature during the early stage (the former stage in accordance with the description given formerly) of preoxidation. In the present invention, since the preoxidation is carried out in the presence of phosphorous and/or boron, the preoxidized fiber obtained has an extremely low core ratio as compared with the preoxidized fiber obtained by the conventional method.

The preoxidation is carried out at temperatures in the range of 200° to 400° C. The optimum temperature, though variable to some extent with the kind of the medium for the preoxidation and the condition of the incorporation of phosphorus and/or boron, falls in the range of 225° to 350° C. The core ratio can be lowered and the speed of preoxidation can be heightened effectively by dividing the preoxidation step into two stages. The former stage of preoxidation is then carried out at temperatures in the range of 225° to 350° C. and the latter stage of preoxidation at higher temperatures in the range of 250° to 400° C. When the temperature for the latter stage is elevated by a scale in the range of 10° to 50° C. over that for the former stage, the produced fiber acquires greater strength and this fiber is obtained in higher yields.

The tension to be imparted to the fiber during the preoxidation is preferably such that the actual shrinkage of the fiber at the temperature of preoxidation will fall in the range of 70 to 90% of the free shrinkage of the fiber at that temperature during the preoxidation. When the actual shrinkage is less than 70%, the tow is liable to break. When it exceeds 90%, the fiber tends to be degraded in mechanical property and embrittled during the step of activation. The expression "free shrinkage" as used in this invention means the ratio of the shrinkage which occurs when the fiber is allowed to shrink under a tension of 1 mg/d in an oxidizing atmosphere at a specific temperature, to the original length.

The preoxidized fiber obtained by the treatment of preoxidation in accordance with this invention may be effectively utilized in its unaltered form as a flame-resistant fiber. Since this fiber is uniformly preoxidized to the center, it can be activated quickly at a high temperature. This activation produces activated carbon fiber in high yields without producing any cavity in the fiber.

On completion of the preoxidation, the preoxidized fiber is subjected to activation. The phosphorus and/or boron content of this preoxidized fiber is adjusted in the range of 0.04 to 1%, preferably 0.06 to 0.6%. When necessary, therefore, the phosphorus and/or boron compound is added to the fiber after the preoxidation. When the amount of the phosphorus and/or boron compound is less than 0.04% during the step of activation, the yields of activation are low and the properties of the activated carbon fiber are insufficient. When the amount is more than 1%, the incorporation of the phosphorus and/or boron compound occurs unevenly and the phenomenon of agglutination follows and the fiber is deprived of its suppleness by an excessive deposit of the compound. The incorporation of the phosphorus and/or boron compound in the preoxidized fiber is generally carried out by method (3) mentioned above. Although the temperature of the incorporation may be elevated up to about 70° C., there is no particular need for heating the fiber.

The thus obtained preoxidized fiber can be activated by any of the methods hitherto known to the art.

The activation may be carried out either batchwise or continuously. The continuous method which continuously feeds the preoxidized fiber into the furnace for activation and allows the fiber to be continuously activated therein is more desirable. In this case, since the feed rate of the preoxidized fiber increases with the rising temperature of activation, there is a possibility that the preoxidized fiber will entrain air while entering the furnace of activation. This would cause the fiber to be unevenly activated. To preclude this trouble, the inner pressure of the furnace of activation is preferably maintained in the range of 0.002 to 2 $kg/cm^2$ (gauge pressure; which invariably applies hereinafter) by suitably adjusting the size of the slit formed in the entrance and introducing nitrogen gas or steam into the furnace. Where the inner pressure of the furnace is lower than 0.002 $kg/cm^2$ or below 0, the production of activated carbon fiber of high quality is not attained because the fiber is unevenly activated and turned to ashes. When the inner pressure is excessively heightened, the steam is condensed throughout the region including the slit and the low-temperature zone. This causes the slit to be clogged. Accordingly, the fiber is liable to be unevenly activated.

As an activating gas, there is used an active gas, for example, a gas selected from the group consisting of steam, ammonia, carbon dioxide and a mixture thereof. Optionally, this active gas may be mixed with an inactive gas, for example, a gas selected from the group consisting of nitrogen, helium, argon, carbon monoxide, nitrogen dioxide gas, and mixtures thereof. The concentration of the active gas in the activating gas is generally in the range of 5 to 100% by volume, preferably in the range of 20 to 100%. It is particularly desirable to use a mixture of carbon dioxide gas and/or nitrogen gas containing 30 to 70% by volume of steam.

Heretofore, the treatment for the activation of the preoxidized fiber generally has been carried out at temperatures in the neighborhood of 800° C. The preoxidized fiber which was obtained by the preoxidation of special conditions can be activated at temperatures in the range of 900° to 1,300° C. without entailing breakage of the fiber during the treatment. This activation enables activated carbon fiber of high quality to be produced stably at an operational capacity 10 to 40 times the capacity of the conventional method. The preferred temperature for the activation is in the range of 1,100° to 1,200° C.

The time for the activation is generally in the range of 10 seconds to 60 minutes, although it is variable to some extent with the kind and temperature of activating medium, the kind of preoxidized fiber, the kind and content of phosphorus and/or boron, and the specific surface area of activated carbon fiber desired to be produced. The specific surface area of the activated carbon fiber is generally not less than 300 $m^2/g$, preferably not less than 700 $m^2/g$, although it is variable with the nature of use contemplated. By the method of the present invention, the activated carbon fiber can be easily produced with a specific surface area of 1,700 $m^2/g$.

In accordance with this invention, the diffusion of the activating gas through the surface and interior of the fiber in the course of activation is advantageously effected and the yields of activation, and the mechanical properties and adsorbing ability of fiber are notably improved because the activation can be thoroughly effected at such high temperatures as 900° to 1,300° C.

The activated carbon fiber obtained by the method of this invention has a very high volumetric ratio of micropores to the total volume of pores (measuring not more than 20 Å in pore radius) as compared with the activated carbon fiber obtained by the conventional method. The volumetric ratio is more than 45% in the case of activated carbon fiber having a specific surface area of 800 m$^2$/g, for example. This particularly high volumetric ratio of micropores is believed to evince the improvement in yields of activation and adsorbing ability.

By the method of this invention, a preoxidized fiber having a low core ratio and a high amount of bonded oxygen can be produced in a short period of time. The activation of this preoxidized fiber permits an activated carbon fiber of high adsorbing ability and high strength to be obtained stably at high temperatures in high yields. Moreover, the activated carbon fiber thus produced abounds with processibility into yarns, woven fabrics, felt, non-woven fabrics, etc.

The present invention will now be described specifically with reference to working examples and comparative examples. In the examples, the letter P is used to denote phosphorus and the letter B boron. Whenever percents (%) are mentioned, they are meant as percents by weight unless otherwise specified. Adsorption of benzene was determined by the measurement specified by JIS K 1474-1975.

EXAMPLE 1

A 540,000-denier tow (3 denier in single fiber size) of fibers obtained from a copolymer composition of 94.0% of acrylonitrile and 6.0% of methyl acrylate was immersed in a 0.14% diammonium phosphate aqueous solution at 20° C. for 2 minutes until the fibers contained 0.1% as P of diammonium phosphate based on the weight of fiber. Subsequently, the tow was preoxidized in air at 240° C. for two hours and further at 270° C. for 0.5 hour under application of a tension such that the shrinkage of fiber reached 75% of the free shrinkage. Consequently, there was obtained a preoxidized fiber having 17.4% of bonded oxygen and a core ratio of 2.4%. The fiber thus obtained was then treated with the aforementioned aqueous diammonium phosphate aqueous solution until the phosphorus compound content was adjusted to 0.45% as P. It was then activated in a furnace kept at an activating temperature of 1,000° C. and an inner pressure of 0.01 kg/cm$^2$ and filled with an activating gas (a 2:1 mixture of H$_2$O and N$_2$ by volume) for 2.5 minutes. Consequently, there was obtained an activated carbon fiber having a specific surface area of 1,000 m$^2$/g, tensile strength of 45.4 kg/mm$^2$, and a benzene adsorbing ability of 53% in a yield of 27.9%.

COMPARATIVE EXAMPLE 1

A tow of the same composition as the tow of Example 1 was directly subjected to preoxidation without incorporation of P or B. There was obtained a preoxidized fiber having 14.5% of bonded oxygen and a core ratio of 18.9%. This preoxidized fiber was activated in a furnace kept at an activating temperature of 850° C. and an inner pressure of 0.01 kg/cm$^2$ and filled with activating gas (a 2:1 mixture of H$_2$O and N$_2$ by volume) for 4.5 minutes. Consequently, there was obtained an activated carbon fiber having a specific surface area of 870 m$^2$/g, a tensile strength of 27.4 kg/mm$^2$, and a benzene adsorbing ability of 28.9% in a yield of 23.4%.

COMPARATIVE EXAMPLE 2

The preoxidized fiber obtained in Comparative Example 1 was activated in a furnace kept at an activating temperature of 1,000° C. and an inner pressure of 0.01 kg/cm$^2$ and filled with an activating gas (a 2:1 mixture of H$_2$O and N$_2$ by volume) for 2.5 minutes. In the course of activation, however, the fiber was cut and no product could be collected.

EXAMPLE 2

By following the procedure of Example 1, except that the conditions indicated in the following table were varied as shown, there were obtained activated carbon fibers having a fixed specific surface area of 1,040±60 m$^2$/g. The yields and the benzene adsorbing abilities of these fibers were as shown in Table 1.

TABLE 1

| | Preoxidation Conditions | | | | Preoxidized Fiber | | Activation Conditions | | Properties of Activated Carbon Fiber | | | |
|---|---|---|---|---|---|---|---|---|---|---|---|---|
| | | | | | Amount of | Core | | | Specific | | Benzene | |
| Run No. | P Content (%) | Temperature (°C.) | Time (hr) | Shrinkage (%) | Bonded Oxygen (%) | Ratio (%) | P Content (%) | Temperature (°C.) | Surface Area (m$^2$/g) | Yield* (%) | Adsorption (%) | Remarks |
| 1 | 0.03 | 240 × 270 × | 2 0.5 | 75 | 16.5 | 2 | (0.02) | (800) | 1,050 | 77 | 40 | |
| 2 | " | 240 × 270 × | 2 0.5 | " | " | " | (0.02) | 1,200 | — | — | — | Consumed by heat |
| 3 | " | 240 × 270 × | 2 0.5 | " | " | " | 0.14 | (800) | 980 | 81 | 38 | |
| 4 | " | 240 × 270 × | 2 0.5 | " | " | " | " | 1,200 | 1,000 | 100 | 53 | Present invention |
| 5 | 0.2 | 245 × 275 × | 1.5 0.5 | " | " | " | (1.10) | (800) | 1,020 | 65 | 25 | |
| 6 | " | 245 × 275 × | 1.5 0.5 | " | " | " | (1.10) | 1,200 | 1,000 | 72 | 26 | Fiber form not retained |
| 7 | " | 245 × 275 × | 1.5 0.5 | " | " | " | 0.20 | (800) | 1,000 | 79 | 37 | |
| 8 | " | 245 × 275 × | 1.5 0.5 | " | " | " | 0.20 | 1,200 | 1,070 | 98 | 51 | Present invention |
| 9 | (0) | 240 × | 2.0 | " | 15.5 | 20 | 0.50 | (800) | 1,060 | 61 | 27 | |

TABLE 1-continued

| | Preoxidation Conditions | | | | Preoxidized Fiber Amount of Bonded Oxygen (%) | Core Ratio (%) | Activation Conditions | | Properties of Activated Carbon Fiber | | | |
|---|---|---|---|---|---|---|---|---|---|---|---|---|
| Run No. | P Content (%) | Temperature (°C.) | Time (hr) | Shrinkage (%) | | | P Content (%) | Temperature (°C.) | Specific Surface Area (m²/g) | Yield* (%) | Benzene Adsorption (%) | Remarks |
| 10 | (0) | 275 × 1.0 240 × 2.0 | | " | " | 20 | 0.50 | 1,200 | 1,000 | 54 | 24 | |
| 11 | 0.15 | 275 × 1.0 240 × 2.0 | | " | (14.0) | 1 | 0.60 | (800) | 1,100 | 54 | 41 | |
| 12 | 0.15 | 265 × 1.0 240 × 2.0 | | " | (") | 1 | 0.60 | 1,200 | — | — | — | Agglutination during activation |
| 13 | (0.50) | 265 × 1.0 240 × 2.0 | | " | — | — | — | — | — | — | — | Heavy agglutination and fiber breakage |
| 14 | (0.90) | 265 × 1.0 240 × 2.0 265 × 1.0 | | " | — | — | — | — | — | — | — | breakage during preoxidation |

*The values given under this heading are relative values calculated on the basis of the yield of Run No. 4 taken as 100.
Note:
Values in parentheses are outside the scope of the present invention.

It is noted from Table 1 that for the activated carbon fibers of high benzene adsorbing ability to be obtained in high yields, the preoxidized fibers should possess amounts of bonded oxygen, core ratios, and activating temperatures invariably falling within the ranges specified by this invention.

EXAMPLE 3

A 450,000-denier tow (1.5 denier in single fiber size) of fibers obtained from a copolymer composition of 92.4% of acrylonitrile and 7.6% of methyl methacrylate was immersed in a 0.32% boric acid aqueous solution at 20° C. for 1 minute until the fibers contained 0.19% as B of boric acid based on the weight of fiber. Subsequently, the fiber was preoxidized in air at 250° C. for 2 hours and further at 270° C. for 0.5 hour under application of a tension such that the shrinkage of fiber reaches 80% of the free shrinkage. There was obtained a preoxidized fiber having 17.7% of bonded oxygen and a core ratio of 1.4%. The fiber thus obtained was then treated with the aforementioned aqueous boric acid solution until the boron content was adjusted to 0.45%. It was then activated in a furnace kept at an activating temperature of 1,100° C. and an inner pressure of 0.009 kg/cm² and filled with an activating gas (a 4:1 mixture of $H_2O$ and $CO_2$ by volume) for 3.5 minutes. Consequently, there was obtained an activated carbon fiber having a specific surface area of 1,050 m²/g, a tensile strength of 47.1 kg/mm², and a benzene adsorbing ability of 57.4%.

EXAMPLE 4

A 540,000-denier tow (3 denier in single fiber size) of fibers obtained from a copolymer composition of 93% of acrylonitrile and 7% of methyl acrylate was immersed in 0.35% diammonium phosphate aqueous solution at 25° C. for 2 minutes until the fibers contained 0.18% as P of the phosphorus compound based on the weight of the fiber. Subsequently, the tow was preoxidized in air at 250° C. for 2 hours. The thus obtained preoxidized fiber had 7% of bonded oxygen. This preoxidized fiber was further oxidized in nitrogen gas containing 4% of oxygen (by volume) at 290° C. for 20 minutes under a tension such that the shrinkage of fiber reached 80% of the free shrinkage at the temperature.

The preoxidized fiber thus obtained had 18.0% of bonded oxygen and a core ratio of 1.5%.

The preoxidized fiber was treated with the same aqueous phosphoric acid solution used above until the phosphorus content was adjusted to 0.35%. It was then treated in a furnace kept at an activating temperature of 1,050° C. and an inner pressure of 0.01 kg/cm² and filled with an activating gas (a 4:1 mixture of $H_2O$ and $CO_2$ by volume) for 4 minutes.

Consequently, there was obtained an activated carbon fiber in a yield of 30% which had a specific surface area of 1,000 m²/g, a tensile strength of 39 kg/mm², and a benzene adsorbing ability of 55.0%.

EXAMPLE 5

A 540,000-denier tow (3 denier in single fiber size) of fibers obtained from a copolymer composition of 94.0% of acrylonitrile and 6.0% of methyl acrylate was immersed in a 0.14% diammonium phosphate aqueous solution at 20° C. for 2 minutes until the fibers contained 0.07% as P of the phosphorus compound. Subsequently, the fiber was preoxidized in air at 240° C. for 2 hours. There was obtained a preoxidized fiber having 6.8% of bonded oxygen. The fiber thus obtained was then treated with the aforementioned aqueous diammonium phosphate solution until the phosphorus content was adjusted to 0.24%. It was then further preoxidized in air at 270° C. for 0.5 hour. Preoxidation was conducted under application of a tension such that the shrinkage of fiber reached 75% of the free shrinkage through the former and the latter stages. There was obtained a preoxidized fiber having a P content of 0.41%, 16.8% of bonded oxygen, a core ratio of 0.5%, a tensile strength of 32 kg/mm², and a tensile elongation of 18%. The preoxidized fiber was activated in a furnace kept at an activating temperature of 1,000° C. and an inner pressure of 0.02 kg/cm² and filled with an activating gas (a 3:1 mixture of $H_2O$ and $N_2$ by volume). There was consequently obtained an activated carbon fiber having a specific surface area of 980 m²/g, a tensile strength of 46.4 kg/mm², and a benzene adsorbing ability of 55% in a yield of 29.4%.

EXAMPLE 6

A 45% $ZnCl_2$ aqueous solution containing 8.8% of a polymer of the same composition as the copolymer of Example 4 was spun into a 45% $ZnCl_2$ aqueous solution. The produced fiber, while in the form of gel tow, was immersed in a 0.6% n-butyl-bis(2-chloroethyl)phosphate aqueous solution at 50° C. for 30 seconds until the fiber contained 0.12% as P of the phosphorus compound. The fiber was drawn to 15 times the original length, relaxed 21% and then dried to afford a 540,000-denier two (3 denier in single fiber size). This fiber was preoxidized in air at 240° C. for 2 hours. At the end of the treatment, the preoxidized fiber had 7.4% of bonded oxygen. The fiber in process of preoxidation was immersed in a 0.31% boric acid aqueous solution at 20° C. (for about 1 minute) until the fiber contained 0.28% as B of the boron compound. The fiber subsequently further preoxidized in air at 270° C. for 0.5 hour. Preoxidation was conducted under application of a tension such that the shrinkage of fiber reached 75% of the free shrinkage through the former and the latter stages. There was obtained a preoxidized fiber having a P content of 0.12%, a B content of 0.28%, an amount 17.0% of bonded oxygen, a core ratio of 1.1%, a tensile strength of 34 kg/mm$^2$, and a tensile elongation of 19%. This fiber was activated in a furnace kept at an activating temperature of 1,000° C. and an inner pressure of 0.005 kg/cm$^2$ and filled with steam for 4 minutes. There was consequently obtained an activated carbon fiber having a specific surface area of 1,000 m$^2$/g, a tensile strength of 44.1 kg/mm$^2$, and a benzene adsorbing ability of 53.4% in a yield of 28.5%.

EXAMPLE 7

A 450,000-denier tow (1.5 denier in single fiber size) of fibers obtained from a copolymer composition of 92.4% acrylonitrile and 7.6% methyl methacrylate was immersed in a 0.32% boric acid aqueous solution at 20° C. for about 1 minute until the fiber contained 0.2% as B of the boric acid. Subsequently, the fiber was preoxidized in air at 250° C. for 2 hours. The thus obtained preoxidized fiber was found to have 7.9% of bonded oxygen. The fiber in the process of preoxidation was treated with the same boric acid aqueous solution as described above until the boron compound content was adjusted to 0.21% as B. It was then further preoxidized in air at 270° C. for 0.5 hour. Preoxidation was conducted under application of a tension such that the shrinkage of fiber reached 75% of the free shrinkage through the former and the latter stages. There was consequently obtained a preoxidized fiber having a B content of 0.41%, 18.4% of bonded oxygen, a core ratio of 1.5%, a tensile strength of 35 kg/mm$^2$, and a tensile elongation of 20%. When this fiber was activated in a furnace kept at an activating temperature of 1,100° C. and an inner pressure of 0.015 kg/cm$^2$ and filled with an activating gas (a 4:1 mixture of H$_2$O and CO$_2$ by volume) for 3.5 minutes, there was obtained an activated carbon fiber having a specific surface area of 980 m$^2$/g, a tensile strength of 48.2 kg/mm$^2$, and a benzene adsorbing ability of 51.0% in a yield of 30.4%.

EXAMPLE 8

The same tow of fibers as used in Example 7 was immersed in a 0.08% boric acid aqueous solution at 25° C. for about 1 minute until the fiber contained 0.1% as B of boric acid. The fiber was then preoxidized in air at 250° C. for 2 hours. The fiber at this point was found to have 7.5% of bonded oxygen. The fiber in the process of preoxidation was treated with the same boric acid aqueous solution as described above until the boron compound content was adjusted to 0.18% as B. The fiber was then further preoxidized in air at 270° C. for 30 minutes. Preoxidation was conducted under application of a tension such that the shrinkage of fiber reached 80% of the free shrinkage through the former and the latter stages. There was obtained a preoxidized fiber having 18.0% of bonded oxygen and a core ratio of 0.4%. This preoxidized fiber was immersed in a 0.51% orthophosphoric acid aqueous solution at 20° C. for about 1 minute until the phosphorus compound content to 0.31% as P. The boron compound content was 0.18% as B. The thus treated fiber was then activated in a furnace kept at an activating temperature of 1,150° C. and an inner pressure of 0.015 kg/cm$^2$ and filled with an activating gas (a 4:1 mixture of H$_2$O and CO$_2$ by volume) for 2 minutes, there was obtained an activated carbon fiber having a specific surface area of 1,100 m$^2$/g, a strength of 49.4 kg/mm$^2$, and a benzene adsorbing ability of 53.9% in a yield of 29.4%.

EXAMPLE 9

A fiber of the same composition as the fiber of Example 7 was immersed in an aqueous solution of a mixture consisting of ammonium phosphate (0.4%) and boric acid (0.15%) in a P:B ratio of 2:1 for about 1 minute until the fiber contained 0.2% of P and 0.1% of B, respectively. The thus treated fiber was preoxidized in air at 250° C. for 15 hours. There was obtained a preoxidized fiber having 7.1% of bonded oxygen. This fiber was treated with a 0.15% boric acid aqueous solution at 25° C. until the boron compound content was adjusted to 0.18% as B. It was then further preoxidized in air at 270° C. for 30 minutes. Preoxidation was conducted under application of a tension such that the shrinkage of fiber reached 75% of the free shrinkage through the former and the latter stages. There was consequently obtained a preoxidized fiber having 18.9% of bonded oxygen and a core ratio of 0.9%. The fiber was further immersed in an aqueous 0.45% diammonium phosphate solution at 20° C. for about 1 minute until the contents of P and B were adjusted to 0.30% and 0.28%, respectively. The thus treated fiber was activated in a furnace kept at an activating temperature of 1,200° C. and an inner pressure of 0.015 kg/cm$^2$ and filled with an activating gas (a 4:1 mixture of H$_2$O and N$_2$ by volume) for 1.5 minutes, there was obtained an activated carbon fiber having a specific surface area of 1,250 m$^2$/g, a tensile strength of 39.7 kg/mm$^2$, and a benzene adsorbing ability of 58.7% in a yield of 28.4%.

EXAMPLE 10

A 90,000-denier tow (3 denier in single fiber size) of fibers obtained from a copolymer composition of 90.0% of acrylonitrile and 10% of vinylidene chloride was immersed in a 0.2% pyrophosphoric acid aqueous solution at 20° C. for about 1 minute until the fiber contained 0.11% as P of the phosphorus compound. It was further treated with a 0.2% ferric chloride aqueous solution at 20° C. until the fiber contained 0.02% as Fe of the iron compound. Then, the fiber was preoxidized in air at 255° C. for 1 hour. At this point the preoxidized fiber was found to have 7.5% of bonded oxygen. The fiber was further treated with the same pyrophosphoric acid aqueous solution as described above until the P content was adjusted to 0.14%. It was subsequently preoxidized in a mixed gas consisting of 5.5% by volume of oxygen and 94.5% by volume of nitrogen at 290° C. for 20 minutes. Preoxidation was conducted under application of a tension such that the shrinkage of fiber reached 75% of the free shrinkage through the former and the latter stages. At this point, the fiber was found to have 19.5% of bonded oxygen, a core ratio of 0.1%, and P content of 0.25%. The thus obtained fiber was treated in a furnace kept at an activating temperature of 1,150° C. and an inner pressure of 0.11 kg/cm$^2$ and filled with an activating gas (a 4:1 mixture of $H_2O$ and $N_2$ by volume). There was obtained an activated carbon fiber having a specific surface area of 1,250 m$^2$/g, a tensile strength of 41.9 kg/mm$^2$, and a benzene adsorbing ability of 57.4% in a yield of 29.9%.

EXAMPLE 11

To a 90,000-denier tow (1.5 denier in single fiber size) of acrylic fibers having a polymer composition of 90.0% of acrylonitrile and 10.0% of vinylidene chloride was added diammonium phosphate and boric acid to produce a fiber containing 0.15% of P and 0.10% of B. This fiber was preoxidized until the amount of bonded oxygen reached 7.5%. Then, it was treated so as to have its P content adjusted to 0.3%. It was further preoxidized in air at 270° C. for varying lengths of time to produce fibers having varying amounts of bonded oxygen. During the former and latter stages of preoxidation, the fibers were kept under a tension such that the shrinkage of fiber reached 75% of the free shrinkage.

Then, each of the fibers were continuously activated in a furnace kept at an activating temperature of 1,100° C. and an inner pressure of 0.015 kg/cm$^2$ and filled with a mixed gas (a 2:1 mixture of $H_2O$ and $N_2$ by volume), to afford an activated carbon fiber having a specific surface area of 1,000±20 m$^2$/g. The activated carbon fibers were tested for yield of activation and fiber strength. The results were as shown in Table 2.

A preoxidized fiber lacking both phosphorus and boron and having about the same amount of bonded oxygen was prepared and was activated under the same conditions. The results are also shown in Table 2.

bonded oxygen and core ratio satisfy the conditions of the present invention and further that for the fiber to satisfy the core ratio specified in this invention, the acrylic fiber must contain P and/or B as specified by this invention.

EXAMPLE 12

A 90,000-denier tow (3 denier in single fiber size) of acrylic fibers obtained from a copolymer compositions of 92.0% of acrylonitrile, 4.5% of methyl methacrylate, and 3.5% of acrylamide was prepared. A first portion of the tow was preoxidized, with absolutely no addition of either phosphorus or boron made thereto before and during the preoxidation (No. 1). A second portion of the tow was preoxidized, with phosphorus or boron added thereto in an amount smaller than the lower limit of the range specified by the present invention, only before the preoxidation (No. 2). Third through sixth portions of the tow were preoxidized, with phosphorus and/or boron added thereto in varying amounts falling in the range specified by this invention only before the preoxidation (Nos. 3–6). Seventh through 12th portions of the tow were preoxidized, with first addition of phosphorus and/or boron made before the preoxidation and second addition thereof made during the preoxidation (Nos. 7–12). A 13th portion of the tow was preoxidized, with an excess amount of phosphorus added before the preoxidation and additional phosphorus incorporated during the preoxidation (No. 13). The produced preoxidized fibers were tested for core ratio and amount of bonded oxygen. The results were as shown in Table 3. Preoxidation except latter stage of preoxidation of Run No. 11 and Run No. 12 was conducted using nitrogen containing 25% by volume of oxygen as the medium of preoxidation. In Run No. 11, the preoxidation of the latter stage was carried out in an atmosphere of nitrogen containing 5% by volume of oxygen. In Run No. 12, the preoxidation of the latter stage was conducted in an atmosphere of nitrogen containing 2% by volume of oxygen.

TABLE 2

| | Preoxidation Conditions | | | | | | | | Preoxidized Fiber | | | | Activated Carbon Fiber | |
|---|---|---|---|---|---|---|---|---|---|---|---|---|---|---|
| | Former Stage | | | | Latter Stage | | | | Amount of Bonded Oxygen (%) | Core Ratio (%) | P (%) | B (%) | Tensile Strength (kg/mm$^2$) | Yield of Activation (%) |
| Run No. | P (%) | B (%) | Temperature (°C.) | Time (hr) | Added P (%) | Added B (%) | Temperature (°C.) | Time (hr) | | | | | | |
| 1 (This Invention) | 0.15 | 0.1 | 250 | 1.5 | 0.15 | 0 | 270 | 0.5 | 16.8 | 2.4 | 0.30 | 0.05 | 44 | 26 |
| 2 (This Invention) | " | " | 245 | 2.0 | " | 0 | 270 | " | 17.4 | 2.1 | " | 0.05 | 47 | 24 |
| 3 (Comparative Experiment) | " | " | 250 | 1.5 | " | 0 | 260 | " | (12.1) | 2.4 | " | 0.05 | 18 | 17 |
| 4 (Comparative Experiment) | " | " | 245 | 2.0 | " | 0 | 265 | " | (14.2) | 2.5 | " | 0.05 | 22 | 18 |
| 5 (Comparative Experiment) | (0) | (0) | 235 | 3.0 | 0 | 0 | 265 | " | (11.1) | 12.4 | 0 | 0 | 11 | 16 |
| 6 (Comparative Experiment) | (0) | (0) | 235 | 4.0 | 0 | 0 | 270 | 1.0 | 18.5 | 21.7 | 0 | 0 | 17 | 19 |

Note:
Values shown in parentheses are outside the scope of the present invention.

It is noted from Table 2 that production of an activated carbon fiber having high strength in a high yield requires use of a preoxidized fiber whose amount of

TABLE 3

| Run No. | | Amount Added P (%) | Amount Added B (%) | Preoxidation Treatment Temperature (°C.) | Preoxidation Treatment Time (hr) | Preoxidized Fiber Amount of Bonded Oxygen (%) | Preoxidized Fiber Core Ratio (%) |
|---|---|---|---|---|---|---|---|
| 1 (Comparative) | Former stage | 0 | 0 | 255 | 1.5 | 5 | (19.0) |
|  | Latter stage | 0 | 0 | 270 | 2 | (14.2) |  |
| 2 (Comparative) |  | 0.005 | 0 | 255 | 5 | (14.1) | (20.4) |
| 3 |  | 0.05 | 0 | 250 | 3.5 | 17.4 | 7.4 |
| 4 |  | 0.24 | 0 | 250 | 3.5 | 18.5 | 3.5 |
| 5 |  | 0 | 0.14 | 250 | 3.5 | 17.0 | 5.5 |
| 6 |  | 0 | 0.24 | 250 | 3.5 | 17.5 | 3.4 |
| 7 | Former stage | 0.10 | 0 | 250 | 1.5 | 7.5 | 2.4 |
|  | Latter stage | 0.20 | 0 | 270 | 0.5 | 18.4 |  |
| 8 | Former stage | 0.10 | 0 | 250 | 1.5 | 7.5 | 1.7 |
|  | Latter stage | 0 | 0.24 | 270 | 0.5 | 18.5 |  |
| 9 | Former stage | 0.10 | 0 | 250 | 1.0 | 6 | 1.5 |
|  | Latter stage | 0.30 | 0 | 300 | 0.2 | 19.5 |  |
| 10 | Former stage | 0.10 | 0 | 250 | 1.0 | 6 | 0.2 |
|  | Latter stage | 0 | 0.24 | 300 | 0.2 | 19.5 |  |
| 11 | Former stage | 0.10 | 0 | 255 | 1.0 | 7.6 | 0.4 |
|  | Latter stage | 0.30 | 0 | 320 | 0.1 | 19.5 |  |
| 12 | Former stage | 0.10 | 0 | 255 | 1.0 | 7.6 | 0.2 |
|  | Latter stage | 0 | 0.24 | 330 | 0.1 | 19.5 |  |
| 13 (Comparative) | Former stage | (0.70) | 0 | 250 | 2 | 4 | (19.8) |
|  | Latter stage | 0.15 | 0 | 270 | 2 | 16.1 |  |

By comparing the results of Run Nos. 3–6 with those of Run Nos. 1, 2 and 13, it is noted that when an acrylonitrile fiber which has phosphorus and/or boron added thereto in an amount falling in the range specified by the present invention is subjected to preoxidation, a preoxidized fiber having a large amount of bonded oxygen and a low core ratio can be obtained at a low temperature in a short period of time. It is noted from the results of Run Nos. 7–12 that the aforementioned effects are enhanced when phosphorus and/or boron is added after the amount of bonded oxygen formed in the fiber has reached 5 to 8% by weight and the amount of phosphorus and/or boron thus added is such that the final content of phosphorus and/or boron in the fiber does not exceed 0.6%. It is further noted from Run Nos. 11 and 12 that the effects described above are further enhanced when, in the two separate stages of preoxidation, the latter stage is carried out with the concentration of oxygen lower than in the former stage.

The preoxidized fibers obtained as described above were each activated for two minutes in a furnace kept at an activating temperature of 1,150° C. and an inner pressure of 0.005 kg/cm$^2$ and filled with an activating gas (a 2:1 mixture of H$_2$O and CO$_2$ by volume). The activated carbon fibers consequently obtained were tested for properties. The results were as shown also in the table.

TABLE 4

| Run No. | Tensile Strength (kg/mm$^2$) | Elongation (%) | Yield of Activation (%) | Benzene Adsorbing Ability (%) | Remarks |
|---|---|---|---|---|---|
| 1 (Comparative) | 25* | 1.4* | 20 (65)* | 37* |  |
| 2 (Comparative) | — | — | — | — | No sample available because fiber was broken in furnace. |
| 3 | 33 | 1.7 | 24 (77) | 49 |  |
| 4 | 35 | 1.8 | 26 (84) | 50 |  |
| 5 | 34 | 1.9 | 25 (81) | 47 |  |
| 6 | 35 | 1.8 | 24 (77) | 51 |  |
| 7 | 37 | 1.9 | 27 (87) | 58 |  |
| 8 | 38 | 1.8 | 26 (84) | 59 |  |
| 9 | 40 | 2.1 | 27 (87) | 61 |  |
| 10 | 39 | 2.2 | 28 (90) | 62 |  |
| 11 | 39 | 2.5 | 29 (94) | 62 |  |
| 12 | 41 | 2.1 | 31 (100) | 64 |  |
| 13 (Comparative) | 14* | 0.9* | 17 (55)* | 47 |  |

Note:
The values given in parentheses are relative values calculated based on the value for Run No. 13 taken as 100.
Results shown with star mark show bad results.

It is noted from Table 4 that by the method of this invention, activated carbon fibers excelling in strength, elongation, and processibility are produced in a short time in high yields.

EXAMPLE 13

A 30,000-denier tow (3 denier in single fiber size) of fibers obtained from a polymer composition of 92.0% of acrylonitrile and 8.0% of acrylamide was immersed in a 0.37% diammonium phosphate aqueous solution at 20° C. for about 1 minute until the fiber contained 0.2% as P of the phosphorus compound. The thus treated fiber was preoxidized in air at 250° C. for 1 hour.

After the amount of bonded oxygen reached 6.4% by weight, the fiber was treated with the same diammonium phosphate aqueous solution as described above until the phosphorus content of the fiber was adjusted to 0.31%. The fiber was subsequently further preoxidized in air at 270° C. for 0.5 hour. During the preoxidation, the fiber was kept under a tension such that the shrinkage of fiber reached 80% of the free shrinkage. Consequently, there was obtained a preoxidized fiber having 18.4% of bonded oxygen and a core ratio of 1.8%.

Aliquots of the preoxidized fiber were activated at varying activating temperatures at a fixed inner pressure of 0.005 kg/cm$^2$ with an activating gas (a 2:1 mixture of $H_2O$ and $CO_2$ by volume), to afford activated carbon fibers having a specific surface area of 1,000 m$^2$/g. The lengths of time required for the activation and the adsorbing abilities possessed by the fibers were as shown in Table 5.

For the purpose of comparison, the fiber of the same polymer composition as described above was subjected to the same preoxidation as described above without adding phosphorus, to afford a preoxidized fiber having an amount 14.1% of bonded oxygen and a core ratio of 13.1%. Aliquots of this preoxidized fiber were subjected to activation under the same conditions as those mentioned above. The activated carbon fibers consequently obtained were tested for properties. The results were as shown in Table 5.

TABLE 5

| | Activation Temperature (°C.) | Activation Time | Benzene Adsorbing Ability (%) |
|---|---|---|---|
| Fiber containing P | 800 | 55 min* | 47.5 |
| | 900 | 12 min* | 49.7 |
| | 1,000 | 5 min* | 52.5 |
| | 1,100 | 3 min* | 63.0 |
| | 1,200 | 1 min* | 61.2 |
| | 1,300 | 30 sec | 58.0 |
| | 1,400 | 15 sec | 37.0* |
| Fiber not containing P | 800 | 100 min* | 43.7* |
| | 900 | 25 min* | 47.4 (brittle fiber was obtained)* |
| | 1,000 | Tow broken* | — |
| | 1,100 | " | — |
| | 1,200 | " | — |
| | 1,300 | " | — |
| | 1,400 | " | — |

Note:
Results shown with star are bad results.

From the results shown above, it is noted that when fibers containing phosphorus are activated at high temperatures, activated carbon fibers of high adsorbing ability are obtained stably and in a short time and that 900° to 1,300° C. are the most effective activation temperatures. Similar results were obtained when boron was used in place of phosphorus.

While the invention has been described in detail and with reference to specific embodiments thereof, it will be apparent to one skilled in the art that various changes and modifications can be made therein without departing from the spirit and scope thereof.

What is claimed is:

1. A method for manufacturing acitivated carbon fiber, comprising the steps of:
   (1) causing an acrylic fiber to contain therein a treating agent, wherein the treating agent is selected from the group consisting of phosphorus and boron compounds in a concentration of 0.01 to 0.3% by weight as phosphorus, boron, or a mixture thereof, based on the weight of the fiber;
   (2) preoxidizing the acrylic fiber in an oxidizing atmosphere at a temperature exceeding 200° C. and giving a core ratio of not more than 18% until the amount of bonded oxygen becomes not less than 15% by weight based on the weight of fiber thereby producing a preoxidized fiber;
   (3) adjusting the concentration of the treating agent in the preoxidized fiber to a level in the range of 0.04 to 1% by weight based on the thus obtained preoxidized fiber; and
   (3) activating the fiber at a temperature in the range of 900° to 1,300° C., until said activated carbon fiber has a specific surface area of not less than 300 m$^2$/g.

2. A method according to claim 1, wherein said acrylic fiber is obtained from a homopolymer or a copolymer containing at least 60% by weight of acrylonitrile.

3. A method according to claim 1, wherein the phosphorus compound is selected from the group consisting of phosphoric acid, metaphosphoric acid, pyrophosphoric acid, phosphorus acid, phosphinic acid, and salts of these acids, alkyl- and aryl-phosphonates, -phosphates and -phosphites of said acids.

4. A method according to claim 1, wherein the boron compound is at least one member selected from the group consisting of boric acid, metaboric acid, salts of said acids, and an organic boron compound represented by a general formula $B(OR)_3$, wherein R represents an alkyl group or aryl group.

5. A method according to any of claims 3 or 4, wherein the salts are ammonium salts, calcium salts or magnesium salts.

6. A method according to claim 1, wherein after the amount of bonded oxygen has become 5 to 8% by weight, a compound selected from the group consisting of phosphorus compounds, boron compounds and mixtures thereof is added to the fiber in an amount not exceeding 0.6% as phosphorus or boron.

7. A method according to claim 1, wherein the inclusion of the phosphorus or boron compound in the acrylic fiber is accomplished by causing a gel fiber which has been produced by solution spinning of an acrylic polymer and not yet subjected to drawing to be immersed in a solution or dispersion containing said phosphorus, boron compound, or mixtures thereof.

8. A method according to claim 1, wherein the inclusion of the phosphorus or boron compound in the acrylic fiber is accomplished by causing a fiber which has been produced by solution spinning of an acrylic polymer and subjected to drawing and not yet subjected to drying to be immersed in a solution or dispersion containing said phosphorus, boron compound or mixture thereof.

9. A method according to claim 1, wherein the inclusion of the phosphorus or boron compound in the acrylic fiber is accomplished after said acrylic fiber has been produced by immersing said acrylic fiber in a solution or dispersion containing said phosphorus, boron compound, or mixture thereof.

10. A method according to any of claims 7, 8 or 9, wherein the fiber is caused to contain therein the phosphorus, boron compound or mixture thereof at a temperature in the range of 5° to 80° C.

11. A method according to any of claims 7, 8 or 9, wherein the solution or dispersion containing the phosphorus, boron compound or mixtures thereof contains a surface active agent.

12. A method according to claim 1, wherein said oxidizing atmosphere comprises 0.2 to 35% by volume of oxygen.

13. A method according to claim 1, wherein preoxidation is carried out in an oxidizing atmosphere comprising 20 to 30% by volume of oxygen until the amount of bonded oxygen becomes 5 to 8% by weight.

14. A method according to claim 1, wherein preoxidation is carried out in an oxidizing atmosphere comprising 0.2 to 9% by volume of oxygen after the amount of bonded oxygen becomes 5 to 8% by weight.

15. A method according to claim 12, wherein preoxidation is carried out in an oxidizing atmosphere containing 95 to 25% by volume of carbon dioxide gas after the amount of bonded oxygen becomes 5 to 8% by weight.

16. A method according to claim 1, wherein said preoxidation is carried out at a temperature of from 200° to 400° C.

17. A method according to claim 1, wherein preoxidation is carried out at a temperature of from 225° to 350° C. until the amount of bonded oxygen becomes 5 to 8% by weight and then carrying out the preoxidation at a 10° to 50° C. higher temperature in the range of 250° to 400° C.

18. A method according to claim 15, wherein said oxidizing atmosphere consists of carbon dioxide and oxygen and preoxidation is carried out at a temperature of 200° to 700° C.

19. A method according to claim 1, wherein a tension is applied to the fiber during the preoxidation so that shrinkage of 70 to 90% of free shrinkage is given to the fiber.

20. A method according to claim 1, wherein activation is carried out in a furnace under an inner pressure of 0.002 to 2 kg/cm$^2$.

21. A method according to claim 1, wherein the inclusion of the additive in the acrylic fiber is accomplished by causing a fiber which has been produced by solution spinning of an acrylic polymer and not yet subjected to drawing, to be sprayed with a solution or dispersion containing the additive.

22. A method according to claim 1, wherein the inclusion of the additive in the acrylic fiber is accomplished by causing a fiber which has been produced by solution spinning of an acrylic polymer and subjecting to drawing and not yet subjected to drying to be sprayed with a solution or dispersion containing the additive.

23. A method according to claim 1, wherein the inclusion of the additive in the acrylic fiber is accomplished after the acrylic fiber has been produced by spraying the acrylic fiber with a solution or dispersion containing the additive.

* * * * *